United States Patent [19]

Nakatsuka et al.

[11] 4,283,195
[45] Aug. 11, 1981

[54] DYESTUFF COMPOSITION FOR DYEING OR PRINTING CELLULOSE FIBER MATERIALS

[75] Inventors: Kiyoharu Nakatsuka; Sadaharu Abeta, both of Toyonaka, Japan

[73] Assignee: Sumitomo Chemical Company, Limited, Osaka, Japan

[21] Appl. No.: 109,856

[22] Filed: Jan. 7, 1980

[30] Foreign Application Priority Data

Feb. 13, 1979 [JP] Japan .................................. 54/15788
Nov. 13, 1979 [JP] Japan .................................. 54/147505

[51] Int. Cl.³ ....................... D06P 67/02; C09B 62/00
[52] U.S. Cl. .......................................... 8/524; 8/549; 8/589; 8/676; 8/918
[58] Field of Search ...................... 8/39 R, 54.2, 89 R, 8/524, 549, 589, 918

[56] References Cited

U.S. PATENT DOCUMENTS

| | | | |
|---|---|---|---|
| 4,078,885 | 3/1978 | Opitz et al. | 8/39 R |
| 4,088,441 | 5/1978 | Meininger et al. | 8/39 R |

*Primary Examiner*—A. Lionel Clingman
*Attorney, Agent, or Firm*—Stevens, Davis, Miller & Mosher

[57] ABSTRACT

A dye composition containing C.I. Reactive Blue 19 and an alkylnaphthalenesulfonic acid/formaldehyde condensate, which is very readily soluble in water and aqueous alkaline liquors and useful for dyeing natural and regenerated cellulose fibers with high color yield, particularly in accordance with a one-bath pad dyeing method.

7 Claims, No Drawings

DYESTUFF COMPOSITION FOR DYEING OR PRINTING CELLULOSE FIBER MATERIALS

The present invention relates to a C.I. Reactive Blue 19 containing dye composition which is very readily soluble in water or aqueous alkali liquors and useful for dyeing cellulose fibers with a high color yield.

C.I. Reactive Blue 19 is a well-known important reactive dye usable for dyeing cellulose fibers, and its free acid has the following formula,

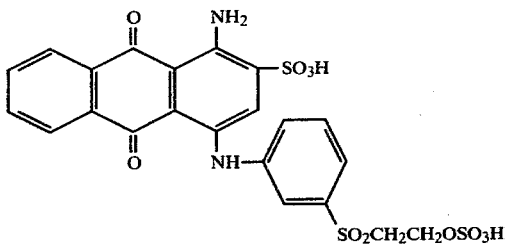

Generally speaking, so-called one-bath pad dyeing methods such as a one-bath pad-batch method, a one-bath pad-dry method and a one-bath pad-steam method have been effectively applied for dyeing natural and regenerated cellulose fibers. For these methods, however, it is essential for dyes to have a high solubility in aqueous alkali liquors. For example, in the one-bath pad-bath method, up to 100 parts by weight of a dye should be dissolved in 1,000 parts by weight of an aqueous solution containing sodium hydroxide, sodium carbonate or trisodium phosphate and electrolytes.

However, C.I. Reactive Blue 19 per se is difficulty soluble in aqueous alkali liquors, so that deep dyeings have levelness and no specks can hardly be obtained.

In order to improve the solubility of C.I. Reactive Blue 19, there are known two methods, i.e. a method (1) comprising providing a dye composition containing a naphthalenesulfonic acid/formaldehyde condensate and the particular dye, and a method (2) comprising providing a dye composition comprising the particular dye, sodium anthraquinone-2-sulfonate, a naphthalenesulfonic acid/formaldehyde condensate (sodium salt), a condensed phosphate (sodium salt) and a dust-preventing agent (U.S. Pat. No. 4,088,441).

The method (1) needs to add large amounts of the naphthalenesulfonic acid/formaldehyde condensate to obtain a sufficient effect, while the method (2) varies in the solubility depending upon the kind of the alkali contained in the aqueous alkali liquor. Further, the foregoing dye compositions produced by the method (1) and (2) are not satisfactory in dyeing efficiency as is apparent from the following experiment: C.I. Reactive Blue 19 and sodium chloride or sodium sulfate were mixed to prepare a dye composition having the same dye content as that of the foregoing dye compositions; the dyeing was carried out according to the above one-bath pad dyeing method using so low dye concentration that the sodium chloride- or sodium sulfate-containing dye composition is readily soluble in aqueous alkali liquors; and on comparing the color depth (referred to as color yield hereinafter) of both dyeings, it was found that the color yield of the foregoing dye composition (improved in solubility) became equal to that of the latter dye composition by increasing the amount by 2 to 5% by weight. Also, in dip dyeing methods requiring no high solubility of dye, unlike the one-bath pad dyeing method, the color yield of the foregoing dye compositions is rather low, as compared with the sodium chloride- or sodium sulfate-containing dye composition.

As a result of an extensive study to overcome the foregoing drawbacks, the present inventors have found a C.I. Reactive Blue 19 containing dye composition which is very readily soluble in water or aqueous alkali liquors and useful for dyeing cellulose fibers with a high color yield.

The present invention provides a dye composition containing C.I. Reactive Blue 19 and an alkylnaphthalenesulfonic acid/formaldehyde condensate, preferably a dye composition containing 20 to 99% by weight, preferably 60 to 80% by weight of C.I. Reactive Blue 19 and 1 to 80% by weight, preferably 20 to 40% by weight of an alkylnaphthalenesulfonic acid/formaldehyde condensate having a sulfonation degree of 50 to 150%, preferably 80 to 120% and an average condensation degree of 1.1 to 3.0, preferably 1.5 to 2.5, and a method for dyeing cellulose fibers which comprises contacting said fibers with a dye bath containing C.I. Reactive Blue 19 and an alkylnaphthalenesulfonic acid/formaldehyde condensate.

The dye compositions of the present invention are markedly soluble in various aqueous alkali liquors, and can produce deep dyeings having excellent levelness and no specks with high dyeing efficiency and high color yield, when used for dyeing cellulose fibers according to the said one-bath pad dyeing method.

The alkylnaphthalenesulfonic acid/formaldehyde condensate can be produced by conventional methods known to the skilled in this art. As the alkylnaphthalenesulfonic acid, at least one member selected from methylnaphthalenesulfonic acid, ethylnaphthalenesulfonic acid, propylnaphthalenesulfonic acid, butylnaphthalenesulfonic acid and the like, for example, are used preferably. The sulfonation degree of these alkylnaphthalenesulfonic acids, which can be controlled by varying the reaction temperature, is 50 to 150%, preferably 80 to 120%, on the average (sulfonation degree of 100% means that 1 mole of sulfonic acid is linked to 1 mole of alkylnaphthalene).

The alkylnaphthalenesulfonic acid/formaldehyde condensates may be used as an alkali metal salt, and their average condensation degree is 1.1 to 3.0, preferably 1.5 to 2.5. These condensates are obtained as a mixture of condensates having various condensation degrees. The average condensation degree can be controlled by varying the amount of formaldehyde against the amount of alkylnaphthalenesulfonic acid.

The dye compositions of the present invention may contain hydrotropic agents (e.g. urea, anthraquinone-2-sulfonic acid) and builders having little or no effect on the solubility of the dye compositions (e.g. dextrin, sucrose). Further, electrolytes (e.g. sodium chloride, sodium sulfate) in small amounts which exert no adverse effect on the solubility of the dye compositions, dust-preventing agents (e.g. mineral oil emulsions), pH stabilizers (e.g. disodium hydrogen phosphate) and water softeners (e.g. polyphosphates) may be added to the dye compositions of the present invention.

The dye compositions of the present invention are obtained by thoroughly mixing 20 to 99% by weight, preferably 60 to 80% by weight, of C.I. Reactive Blue 19, 1 to 80% by weight, preferably 20 to 40% by weight, of the aforesaid condensate and if necessary the aforesaid additives according to conventional methods well known to those skilled in the art.

In carrying out the dyeing of natural or regenerated cellulose fibers, the dye composition of the present invention is dissolved in water and mixed with an aqueous alkali solution to prepare a dye bath (for example, padding liquor). Alternatively, the dye bath can be prepared by mixing C.I. Reactive Blue 19 and the alkylnaphthalene sulfonic acid/formaldehyde condensate in the weight ratio of 20 to 99:80 to 1 together with an alkali and if desired additives as described above, in an aqueous medium. The dyeing is performed by padding said fibers through the dye bath in accordance with the one-bath pad dyeing methods including one-bath pad-batch method, one-bath pad-dry method and one-bath pad-steam method, whereby there can be obtained deep dyeings having excellent levelness and no specks.

The dye compositions of the present invention can also be applied for other conventional dyeing methods, i.e. two-bath pad dyeing, printing and exhaustion dyeing methods.

The present invention is explained in more detail with reference to the following Examples, which are only illustrative and are not intended to limit the scope of the present invention. In the Examples, parts are by weight.

EXAMPLE 1

Sixty-eight parts of 74%-purity C.I. Reactive Blue 19 (sodium salt), 31 parts of an ethylnaphthalenesulfonic acid/formaldehyde condensate (sodium salt) (sulfonation degree 100%, average condensation degree 2.5) and 1 part of a mineral oil emulsion were thoroughly mixed.

(1) The dye composition thus obtained (120 g) was dissolved in hot water and cooled to 25° C. To the dye solution were added 32.5% aqueous sodium hydroxide solution (15 ml) and 50°Bé water glass (150 g), and then the volume of the mixture was made up to 1 liter at 25° C. with water to prepare a padding liquor. Immediately, cotton fabrics were padded through this liquor, batched up, wrapped airtightly with polyethylene film and allowed to stand at 20° C. for 20 hours in a room. The dyeings were rinsed with cold water and then with hot water, soaped in a boiling bath containing a detergent, rinsed with cold water and dried. Thus, dyeings of good levelness and a markedly deep blue color were obtained.

(2) The padding liquor in (1) was allowed to stand at 25° C. for 90 minutes, but dye precipitation from the liquor was not observed at all. Thereafter, cotton fabrics were dyed in the same manner as in (1) using this padding liquor. Thus, very deep dyeings of good levelness were obtained.

EXAMPLE 2

Sixty-eight parts of 74%-purity C.I. Reactive Blue 19 (sodium salt), 31 parts of a methylnaphthalenesulfonic acid/formaldehyde condensate (sodium salt) (sulfonation degree 110%, average condensation degree 1.8) and 1 part of a mineral oil emulsion were thoroughly mixed.

(1) A padding liquor was prepared in the same manner as in (1) of Example 1 using the dye composition thus obtained (120 g). On dyeing cotton fabrics by the padding with this liquor freshly produced, dyeings of good levelness were obtained, and the color yield of the dyeings was equal to that of the dyeings obtained in (1) of Example 1.

(2) The padding liquor in (1) was allowed to stand at 25° C. for 90 minutes, but dye precipitation from the liquor was not observed at all. On pad-dyeing cotton fabrics with this liquor, dyeings of good levelness were obtained.

EXAMPLE 3

Seventy-nine parts of 74%-purity C.I. Reactive Blue 19 (sodium salt), 2 parts of a methylnaphthalenesulfonic acid/formaldehyde condensate (sodium salt) (sulfonation degree 110%, average condensation degree 1.8) and 1 part of a mineral oil emulsion were thoroughly mixed.

(1) A padding liquor was prepared in the same manner as in (1) of Example 1 using the dye composition thus obtained (103 g). On pad-dyeing cotton fabrics with this liquor freshly produced, dyeings of good levelness were obtained, and the color yield of the dyeings was equal to that of the dyeings obtained in (1) of Example 1.

(2) The padding liquor in (1) was allowed to stand at 25° C. for 70 minutes, but dye precipitation from the liquor was not observed. On pad-dyeing cotton fabrics with this liquor, dyeings of good levelness were obtained.

EXAMPLE 4

(1) Sixty-eight parts of 74%-purity C.I. Reactive Blue 19 (sodium salt), 31 parts of anhydrous sodium sulfate and 1 part of a mineral oil emulsion were thoroughly mixed.

(2) The dye composition thus obtained (120 g) and 40 g of a methylnaphthalenesulfonic acid/formaldehyde condensate (sodium salt) (sulfonation degree 110%, average condensation degree 1.5) were dissolved in hot water and cooled to 25° C.

(3) To the dye solution were added 32.5% aqueous sodium hydroxide solution (15 ml) and 50°Bé water glass (150 g), and then the volume of the mixture was made up to 1 liter at 25° C. with water to prepare a padding liquor. Immediately, cotton fabrics were padded with this liquor, batched up, wrapped airtight with polyethylene film and allowed to stand at 20° C. for 20 hours in a room. The dyeings were rinsed with cold water and then with hot water, soaped in a boiling bath containing a detergent, rinsed with cold water and dried. Thus, dyeings of good levelness and a markedly deep blue color were obtained.

(4) The padding liquor in (1) was allowed to stand at 25° C. for 90 minutes, but dye precipitation from the liquor was not observed at all. Thereafter, cotton fabrics were padding-dyed in the same manner as in (3) using this padding liquor. Thus, very deep dyeings of good levelness were obtained.

COMPARATIVE EXAMPLE 1

Sixty-eight parts of 74%-purity C.I. Reactive Blue 19 (sodium salt), 31 parts of a naphthalenesulfonic acid/formaldehyde condensate (sulfonation degree 100%, average condensation degree 5) and 1 part of a mineral oil emulsion were thoroughly mixed.

(1) A padding liquor was prepared in the same manner as in (1) of Example 1 using the dye composition thus obtained (120 g). Immediately after the preparation of the liquor, dye precipitation from the liquor was not observed, and dyeings of good levelness were obtained by pad-dyeing cotton fabrics with this liquor. But, the color yield of the dyeings was lower than that of the dyeings obtained in (1) of Example 1.

(2) On allowing the padding liquor in (1) to stand at 25° C. for 30 minutes, a large amount of the dye precipitated. Cotton fabrics were pad-dyed with this liquor, but only dyeings of extreme unlevelness and of no practical value were obtained.

(3) A padding liquor was prepared in the same manner as in (1) of Example 1 using the dye composition thus obtained (126 g). On pad-dyeing cotton fabrics with this liquor freshly produced, deep dyeings of good levelness were obtained, and the color yield of the dyeings was equal to that of the dyeings obtained in (1) of Example 1.

COMPARATIVE EXAMPLE 2

Sixty-eight parts of 74%-purity C.I. Reactive Blue 19 (sodium salt), 31 parts of a methylnaphthalenesulfonic acid/formaldehyde condensate (sodium salt) (sulfonation degree 98%, average condensation degree 3.5) and 1 part of a mineral oil emulsion were thoroughly mixed.

(1) A padding liquor was prepared in the same manner as in (1) of Example 1 using the dye composition thus obtained (120 g). Immediately after the preparation of the liquor, dye precipitation from the liquor was not observed, and deep-colored dyeings of good levelness were obtained by pad-dyeing cotton fabrics with this liquor. The color yield of the dyeings was equal to that of the dyeings obtained in (1) of Example 1.

(2) The padding liquor in (1) was allowed to stand at 25° C. for 60 minutes, but dye precipitation from the liquor was hardly observed. On pad-dyeing cotton fabrics with this liquor, dyeings of good levelness were obtained.

(3) On allowing the padding liquor in (1) to stand at 25° C. for 70 minutes, dye precipitation from the liquor was observed. Cotton fabrics were dyed by padding with this liquor, but only dyeings of unlevelness were obtained.

COMPARATIVE EXAMPLE 3

According to the method described in Example 3 of U.S. Pat. No. 4,088,441, 68 parts of 74%-purity C.I. Reactive Blue 19 (sodium salt), 7 parts of sodium anthraquinone-2-sulfonate, 4 parts of urea, 4 parts of a condensed phosphate, 14 parts of a naphthalenesulfonic acid/formaldehyde condensate (sodium salt) and 3 parts of a mineral oil emulsion were mixed.

(1) A padding liquor was prepared in the same manner as in (1) of Example 1 using the dye composition thus obtained (120 g). Immediately after the preparation of the liquor, dye precipitation from the liquor was not observed, and dyeings of good levelness were obtained by padding-dyeing cotton fabrics with this liquor. But, the color yield of the dyeings was lower than that of the dyeings obtained in (1) of Example 1, and similar to that of the dyeings obtained in (1) of Comparative Example 1.

(2) On allowing the padding liquor in (1) to stand at 25° C. for 30 minutes, dye precipitation from the liquor as observed. Cotton fabrics were dyed with this liquor by padding, but only dyeings of unlevelness and of little practical value were obtained.

COMPARATIVE EXAMPLE 4

Sixty-eight parts of 74%-purity C.I. Reactive Blue 19 (sodium salt), 31 parts of an ethylnaphthalenesulfonic acid/formaldehyde condensate (sodium salt) (sulfonation degree 45%, average condensation degree 1.5) and 1 part of a mineral oil emulsion were thoroughly mixed.

(1) A padding liquor was prepared in the same manner as in (1) of Example 1 using the dye composition thus obtained (120 g). Immediately after the preparation of the liquor, dye precipitation from the liquor was not observed, and dyeings of good levelness were obtained by pad-dyeing cotton fabrics with this liquor. But the color yield of the dyeings was equal to that of the dyeings obtained in (1) of Comparative Example 1.

(2) The padding liquor in (1) was allowed to stand at 25° C. for 60 minutes, but dye precipitation from the liquor was hardly observed. By pad-dyeing cotton fabrics with this liquor, dyeings of good levelness were obtained.

(3) On allowing the padding liquor in (1) to stand at 25° C. for 90 minutes, the dye precipitated from the liquor. Cotton fabrics were pad-dyed with this liquor, but only dyeings of unlevelness were obtained.

COMPARATIVE EXAMPLE 5

(1) A dye composition was prepared in the same manner as in (1) of Example 4.

(2) The dye composition thus obtained (120 g) was dissolved in hot water and then cooled to 25° C.

(3) A padding liquor was prepared according to (3) of Example 4. Dye precipitation from the liquor was already observed immediately after the liquor was prepared. Cotton fabrics were pad-dyed with this liquor, but only dyeings of extreme unlevelness and of no practical value were obtained.

What is claimed is:

1. A dye composition containing C.I. Reactive Blue 19 and an alkylnaphthalenesulfonic acid/formaldehyde condensate, the sulfonation degree and average condensation degree of said condensate being 50 to 150% and 1.1 to 3.0, respectively.

2. A dye composition according to claim 1, wherein the contents of C.I. Reactive Blue 19 and said condensate are 20 to 99% by weight and 1 to 80% by weight, respectively.

3. A dye composition according to claim 1, wherein said alkylnaphthalenesulfonic acid is at least one member selected from methyl-, ethyl-, propyl and butylnaphthalenesulfonic acids.

4. A dye composition according to claim 1, wherein the composition further contains at least one member selected from hydrotropic agents, builders, electrolytes, dust-preventing agents, pH stabilizers and water softeners.

5. A method for dyeing natural or regenerated cellulose fibers, which comprises contacting said fibers with a dye bath containing C.I. Reactive Blue 19 and an alkylnaphthalenesulfonic acid/formaldehyde condensate, the sulfonation degree and average condensation degree of said condensate being 50 to 150% and 1.1 to 3.0, respectively.

6. A method according to claim 5, wherein the weight ratio of C.I. Reactive Blue 19 to the condensate is 20 to 99:80 to 1.

7. Natural or regenerated cellulose fibers dyed by the method of claim 5.

* * * * *